(12) United States Patent
Lupper et al.

(10) Patent No.: US 11,368,870 B2
(45) Date of Patent: Jun. 21, 2022

(54) DISTRIBUTED ANTENNA SYSTEM WITH IMPROVED UPLINK LEVELING

(71) Applicant: Andrew Wireless Systems GmbH, Buchdorf (DE)

(72) Inventors: Alfred Josef Lupper, Aystetten (DE); Johannes Kroupa, Wiedenzhausen (DE); Alfons Dussmann, Gansheim (DE); Bogdan George Mazilu, Buchdorf (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 0 days.

(21) Appl. No.: 17/014,827

(22) Filed: Sep. 8, 2020

(65) Prior Publication Data
US 2020/0404529 A1    Dec. 24, 2020

Related U.S. Application Data

(63) Continuation of application No. 15/873,764, filed on Jan. 17, 2018, now Pat. No. 10,805,818.
(Continued)

(51) Int. Cl.
*H04W 72/04*     (2009.01)
*H04W 24/10*     (2009.01)
(Continued)

(52) U.S. Cl.
CPC ............ *H04W 24/10* (2013.01); *H04B 7/022* (2013.01); *H04L 1/0026* (2013.01);
(Continued)

(58) Field of Classification Search
CPC ........... H04W 52/146; H04W 72/0413; H04W 88/085; H04B 17/21
See application file for complete search history.

(56) References Cited

U.S. PATENT DOCUMENTS

2005/0176368 A1*  8/2005  Young ............... H04B 7/15578
                                                455/11.1
2008/0175590 A1   7/2008  Perkins et al.
(Continued)

FOREIGN PATENT DOCUMENTS

WO    2009126254 A2   10/2009
WO    2014040608 A1    3/2014
WO    2016092543 A1    6/2016

OTHER PUBLICATIONS

International Searching Authority, "Invitation to Pay Additional Fees and, Where Applicable, Protest Fee from PCT Application No. PCT/EP2018/051247 dated Apr. 20, 2018", From Foreign Counterpart of U.S. Appl. No. 15/873,764; pp. 1-15, Published in EP.
(Continued)

*Primary Examiner* — Fahmida S Chowdhury
(74) *Attorney, Agent, or Firm* — Fogg & Powers LLC

(57) ABSTRACT

Uplink leveling systems and methods for a distribution antenna are provided. An uplink leveling system includes at least one communication path between a base station point of interface and a remote antenna unit. A broadband measurement detector is communicatively coupled to measure signal power in the at least one communication path at the base station point of interface. A signal measurement receiver is communicatively coupled to measure signal power in the at least one communication path. A test signal generator is configured to generate a test signal in the at least one communication path in an uplink. At least one controller is configured to level the communication path in the uplink direction based at least in part on measurements by the broadband measurement detector and the signal measurement receiver in response to the generated test signal by the test signal generator.

8 Claims, 11 Drawing Sheets

Related U.S. Application Data

(60) Provisional application No. 62/447,629, filed on Jan. 18, 2017.

(51) Int. Cl.
   *H04W 52/14* (2009.01)
   *H04L 1/00* (2006.01)
   *H04B 7/022* (2017.01)
   *H04B 7/06* (2006.01)
   *H04W 88/08* (2009.01)
   *H04B 17/21* (2015.01)

(52) U.S. Cl.
   CPC ..... *H04W 52/146* (2013.01); *H04W 72/0413* (2013.01); *H04W 72/0433* (2013.01); *H04B 7/0691* (2013.01); *H04B 17/21* (2015.01); *H04W 88/085* (2013.01)

(56) References Cited

U.S. PATENT DOCUMENTS

| | | | | |
|---|---|---|---|---|
| 2013/0071112 A1* | 3/2013 | Melester | ................ | H04B 1/006 455/67.14 |
| 2013/0163695 A1 | 6/2013 | Jun et al. | | |
| 2014/0119197 A1* | 5/2014 | Maca | ................. | H04B 17/0085 370/241 |
| 2014/0233548 A1* | 8/2014 | Leizerovich | .......... | H04W 84/12 370/338 |
| 2015/0098350 A1 | 4/2015 | Mini et al. | | |
| 2015/0223083 A1 | 8/2015 | Maca et al. | | |
| 2015/0249965 A1* | 9/2015 | Dussmann | .......... | H04W 52/243 455/501 |
| 2016/0352612 A1* | 12/2016 | Daniel | ................. | H04B 7/0413 |
| 2017/0272282 A1* | 9/2017 | Abramov | .......... | H04L 25/03019 |
| 2017/0288767 A1* | 10/2017 | Cho | ................... | H04B 7/15507 |
| 2018/0160315 A1 | 6/2018 | Bennett et al. | | |
| 2018/0206141 A1 | 7/2018 | Lupper et al. | | |

OTHER PUBLICATIONS

International Searching Authority, "Notification of Transmittal of the International Search Report and the Written Opinion of the International Searching Authority, or the Declaration from PCT Application No. PCT/EP2018/051247 dated Jun. 12, 2018", From Foreign Counterpart of U.S. Appl. No. 15/873,764; pp. 1-21, Published in EP.

U.S. Patent and Trademark Office, "Notice of Allowance", U.S. Appl. No. 15/873,764, dated Jun. 8, 2020, pp. 1 through 17, Published: US.

U.S. Patent and Trademark Office, "Office Action", U.S. Appl. No. 15/873,764, dated Dec. 10, 2019, pp. 1-20, Published: US.

U.S. Patent and Trademark Office, "Restriction Requirement", U.S. Appl. No. 15/873,764, dated Jul. 25, 2019, pp. 1 through 7, Published: US.

European Patent Office, "Extended European Search Report from EP Application No. 20199649.3", from Foreign Counterpart to U.S. Appl. No. 15/873,764, dated Dec. 9, 2020, pp. 1 through 7, Published: EP.

* cited by examiner

DISTRIBUTED ANTENNA SYSTEM WITH IMPROVED UPLINK LEVELING

CROSS-REFERENCE TO RELATED APPLICATIONS

This application claims priority to U.S. patent application Ser. No. 15/873,764 filed on Jan. 17, 2018 and U.S. Provisional Application Ser. No. 62/447,629, filed on Jan. 18, 2017, both having the same title herewith and both of which are incorporated in their entirety herein by reference.

BACKGROUND

Wireless cellular service providers use base stations to implement wireless communication links with user devices, such as mobile phones. In particular, a base station is typically in communication with one or more antennas that receive and transmit radio frequency signals to and from user devices. Each base station in turn is in communication with the service provider's core network. The coverage area of a base station is limited by a range of the transmitting and receiving power of its associated antennas. Moreover, the coverage provided by the transmitted radio waves is influenced by many other factors such as physical obstacles and interference. Hence, wireless coverage in buildings and stadiums has been traditionally poor. One system used by wireless cellular service providers to improve coverage provided by a base station or group of base stations in problem areas is a distributed antenna system (DAS). A distributed antenna system can be placed in or near areas that traditionally do not receive good wireless reception such as in or near buildings and stadiums.

A typical distributed antenna system comprises one or more master units and one or more remote units that are communicatively coupled to the master units. A distributed antenna system distributes radio frequency signals coming from a base station to the antennas (and ultimately, user devices) in the downlink and distributes radio frequency signals originating from user devices to the base station in the uplink. On their way through a distributed antenna system the radio frequency signals are attenuated by passive components (cables, combiner, splitter etc.) and amplified by active components like power amplifiers. Typically, a distributed antenna system is configured so that radio frequency signals received from the base station at a given input power level are radiated at each antenna of one or more remote units at a defined power output level and that signals received from user devices are received by the base station at a certain power level. To achieve this, attenuators and amplifiers are adjusted in the distributed antenna system accordingly. This process is called "leveling" of the associated signal path in the distributed antenna system. For enabling power control between the base stations and the remote units of the distributed antenna system, the uplink should have the same attenuation as the downlink or maintain some user defined offset from the downlink attenuation.

A conventional method of leveling includes first measuring the loss and/or gain of a signal path through the distributed antenna system. In order to measure the gain/loss of a signal path from a base station point of interface of the distributed antenna system to each remote antenna unit and vice versa, a test signal at a certain frequency and power is generated in the base station point of interface and measured in each associated remote antenna unit for the downlink and vice versa for the uplink. Based on the measured gain\loss of the signal path, gain adjustments are calculated and the attenuators and amplifiers in the signal path are adjusted accordingly to achieve the desired power levels at the base station in the uplink direction and at each antenna in the downlink direction.

For uplink leveling, each remote antenna unit generates a test signal and a power detector within the base station point of interface measures the power level of the received test signal in the relevant frequency band that should be leveled. For at least cost reasons, the power detector component of the base station point of interface is typically a broadband power detector (for example, a true root mean square (RMS) power detector that reads power across a broad range of frequencies). Because of the broadband power measurement, it is not possible to measure the power level at a select frequency of only the test signal. Therefore, if there is an external signal received by a remote antenna unit that is interfering with the generated test signal, the base station point of interface cannot distinguish between the test signal and the interfering signal and measures the power of the combined signals. This can lead to incorrect measurement results and consequently to incorrect leveling of the uplink communication path. Moreover, inputs from remote antenna units on the uplink cannot be easily closed to prevent interfering signals because of passive intermodulation.

SUMMARY

The following summary is made by way of example and not by way of limitation. It is merely provided to aid the reader in understanding some of the aspects of the invention.

In one embodiment, a method of uplink leveling a communication path in a distributed antenna system is provided. The method includes generating a test signal of a select frequency and select power level in an uplink direction of the communication path. Signal power level measurements of the test signal with a broadband power detector of a base station point of interface that is communicatively coupled to the communication path and a signal measurement receiver that is also communicatively coupled to the communication path are time synchronized. A correction factor is determined based at least in part on a comparison of a first power measurement taken at the select frequency associated with the test signal and a second power measurement over a broadband frequency in which the base station point of interface operates. Gain adjustments are then determined based at least in part on the signal power level measurement of the broadband power detector and the correction factor. The communication path is then leveled based on the determined gain adjustments.

In another embodiment, a method of uplink leveling a communication path in a distributed antenna system is provided. The method includes calibrating measurements of a broadband power detector of a base station point of interface that is communicatively coupled to the communication path and a signal measurement receiver that is communicatively coupled to the communication path. Once calibrated, at least one test signal of a select frequency and power level in an uplink direction of the communication path is generated. The power level of the at least one test signal is measured with the signal measurement receiver at the select frequency. A gain adjustment is determined based at least in part on the calibration of measurements of the broadband power detector and the signal measurement receiver and the measured power level of the at least one test signal with the signal measurement receiver. The communication path is then leveled based on the determined gain adjustments.

In another embodiment, a method of uplink leveling a communication path in a distributed antenna system is provided. The method includes generating a test signal of a select frequency and power level in an uplink direction of the communication path. The test signal is received with a signal measurement receiver that is communicatively coupled to the communication path. It is then determined if there are interfering signals present at the select frequency with the signal measurement receiver. If there are no interfering signals present, gain adjustments are determined based on a measurement of the test signal by a broadband power detector of a base station point of interface that is communicatively coupled to the communication path. The communication path is then leveled based on the determined gain adjustments.

In another embodiment, a method of uplink leveling a communication path in a distributed antenna system is also provided. The method includes using a signal measurement receiver that is communicatively coupled to the communication path to measure signals in an uplink direction of the communication path. At least one open frequency where no signal is detected in the uplink direction of the communication path is determined with the signal measurement receiver. A test signal is tuned to the at least one open frequency. Moreover, a broadband power detector of a base station point of interface that is communicatively coupled to the communication path is also tuned to the at least one open frequency of the test signal. The test signal at the at least one open frequency is then generated. The power of the test signal at the at least one open frequency is determined with the broadband power detector to determine gain adjustments. The communication path is then leveled based on the determined gain adjustments.

In another embodiment, a method of uplink leveling a communication path in a distributed antenna system. The method includes generating a test signal of a select power level and frequency in an uplink direction of the communication path. A detected broadband signal is received in response to the test signal with a signal measurement receiver that is communicatively coupled to the communication path. All components of the detected broadband signal are filtered out except the test signal with the signal measurement receiver. The filtered test signal is output to a broadband power detector of a base station point of interface that is communicatively coupled to the signal measurement receiver. The power of the test signal is measured with the broadband power detector to determine gain adjustments. The communication path is leveled based on the determined gain adjustments.

In another embodiment, a method of uplink leveling a communication path in a distributed antenna system is provided. The method includes generating a first test signal at a first power level and a select frequency in an uplink direction of the communication path. A power level of the first test signal is measured with a broadband power detector of a base station point of interface that is communicatively coupled to the communication path to determine a first broadband power measurement. It is then determined if the first broadband power measurement is greater than a first threshold power level. The first threshold power level is indicative of a maximum amount of interference and noise in a measured test signal that can be corrected for. If the power level of the first measured test signal power level is not greater than the first threshold power level, a second test signal is generated at a second power level and the select frequency in an uplink direction of the communication path. A power level of the second test signal is measured with the broadband power detector of the base station point of interface that is communicatively coupled to the communication path to determine a second broadband power measurement. A broadband power measurement delta between the second measured test signal power level and the first measured test signal power level is then determined. If the broadband power measurement delta is one of greater than and equal to a second threshold power level, a correction factor is calculated. The correction factor is used to determine gain adjustments. The communication path is leveled based on the determined gain adjustments.

In yet another embodiment, an uplink leveling system for a distribution antenna is provided. The uplink leveling system includes at least one communication path between a base station point of interface and a remote antenna unit, a broadband measurement detector, a signal measurement receiver, a test signal generator and at least one controller. The broadband measurement detector is configured to measure signal power over a broadband frequency range. Moreover, the broadband measurement detector is communicatively coupled to measure signal power in the at least one communication path at the base station point of interface. The signal measurement receiver is configured to be frequency tuned. The signal measurement receiver is communicatively also coupled to measure signal power in the at least one communication path. The test signal generator is configured to generate a test signal in the at least one communication path in an uplink direction from the remote antenna unit to the base station point of interface. The at least one controller is in communication with the test signal generator, the signal measurement receiver and the broadband measurement detector. The at least one controller is configured to cause the test signal generator to generate the test signal having a select power and frequency. The at least one controller is further configured to control the tuning of the signal measurement receiver. Moreover, the at least one controller also configured to level the communication path in the uplink direction based at least in part on measurements by the broadband measurement detector and the signal measurement receiver in response to the generated test signal by the test signal generator.

DRAWINGS

Figure 1:
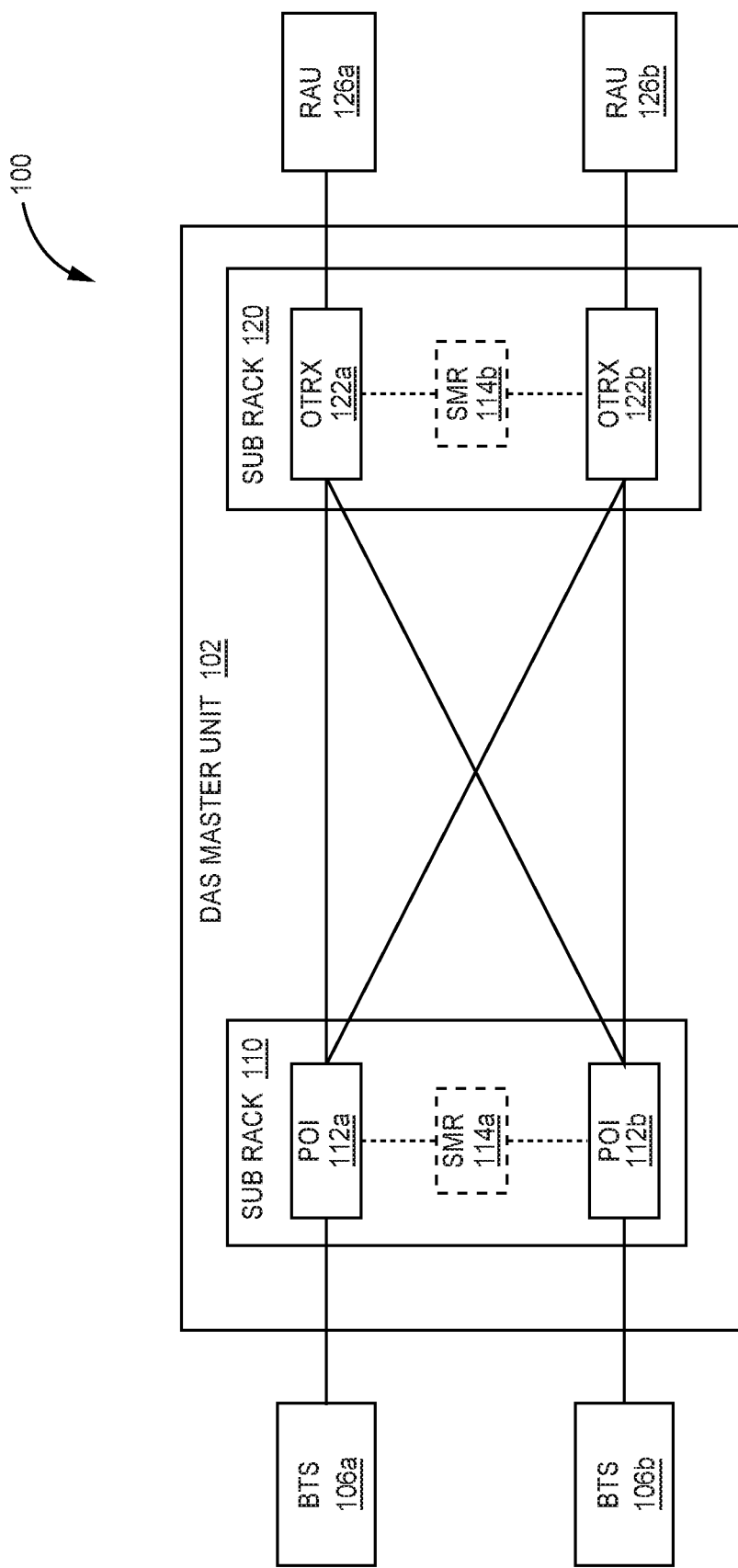
FIG. 1 is a block diagram of a distributed antenna system according to one exemplary embodiment.

In accordance with common practice, the various described features are not drawn to scale but are drawn to

DETAILED DESCRIPTION

In the following detailed description, reference is made to the accompanying drawings, which form a part hereof, and in which is shown by way of illustration specific embodiments. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

As briefly discussed above, noise and interfering signals combined with a test signal may yield inaccurate results with current methods of uplink leveling in a distributed antenna system. Simply closing an antenna port to stop external interfering signals in the uplink while leveling may not work to address this issue since any switch used at the remote antenna units (RAUs) would influence passive intermodulation (PIM) and desensitize the uplink performance during normal DAS operation after leveling has finished. Moreover, as discussed above, although a base station point of interface may include a radio frequency (RF) power detector, the typical RF power detector used in a base station point of interface is designed to measure power over a wideband (that is, it is a broadband power detector). Since power over the whole wideband is measured by the broadband power detector of the base station point of interface, it is typically not possible to measure the signal strength at a given frequency, such as a test signal frequency generated at a remote antenna unit, and distinguish the test signal strength from interfering signals. In addition, if the interfering signal on the uplink is relatively strong, an automatic leveling control (ALC) function may be triggered at an optical transmitter or the base station point of interface and the power level of the total signal will be reduced by a factor so that the peak signal is below the ALC threshold. Under this condition, a power measurement of the test signal at the base station point of interface will not be correct since the power level is reduced by the ALC function. At least some of the exemplary embodiments described below provide systems and methods of uplink leveling a communication path in a distributed antenna system (DAS) with the use of a power measurement device that can be tuned to make power measurements over a narrow band. Hence, this narrow band measurement device can be tuned to the frequency of the test signal. Using this narrowband measurement (in addition to or instead of a broadband measurement), embodiments determine the correct gain\loss of the communication path so appropriate gain adjustments can be calculated. Attenuators and amplifiers in the communication path are then adjusted accordingly to achieve the desired power levels at the base station in the uplink communication path.

Referring to FIG. 1, a simplified block diagram of one embodiment of a DAS 100 is illustrated. In this example embodiment, the DAS 100 includes a DAS master unit 102. The DAS master unit 102 is illustrated as including a first sub rack 110 and a second sub rack 120. The first sub rack 110 includes a first intelligent point of interface (POI) 112a and a second POI 112b. Each POI 112a and 112b, which may be generally designated as 112, is an integrated base transceiver station interface that combines several functions including, for example, at least the following: base transceiver station conditioning, signal splitting and combing, monitoring, testing, remote monitoring, and automatic power leveling functions. In implementing the functions, the POI 112 may include, but are not limited to, a signal leveler, a signal attenuator, a signal splitter, a signal combiner, a receive-and-transmit signal combiner, a multiplexer, a test-tone generator, a radio frequency (RF) power detector, an RF signal tagging mechanism, and the like. Generally, a POI 112 can interface directly with RF sources such as, but not limited to, base stations, repeaters, or a group of RF sources. The RF power detector is typically a broadband power detector. The second sub rack 120 includes a first optical transceiver (OTRX) 122a and a second OTRX 122b, which may be generally designated as 122. As illustrated, the first POI 112a is in communication with both the first and second OTRX 122a and 122b. The second POI 112b is also in communication with the first and second OTRX 122a and 122b. Moreover, in this example, a first base transceiver station (BTS) 106a is in communication with the first POI 112a. A second BTS 106b is in communication with the second POA 112b. As further illustrated, the first OTRX 122a is in communication with a first remote antenna unit (RAU) 126a and the second OTRX 122b is in communication with a second RAU 126b.

In this simplified example of the DAS 100, signals in a downlink direction from the first BTS 106a are communicated to POI 112a. From POI 112a, the downlink direction signals are communicated through respective communication paths to OTRX 122a and OTRX 122b. Then from the respective OTRX 122a and OTRX 122b the downlink direction signals are communicated to the respective first and second RAU 126a and 126b where the signals are radiated from one or more antennas included in or coupled to the RAUs 126a and 126b to user devices in the respective coverage areas. Moreover, signals in the downlink direction associated with the second BTS 106b are communicated to POI 112b. Similar to POI 112a, from POI 112b the downlink direction signals are communicated through respective communication paths to OTRX 122a and OTRX 122b. Then from the respective OTRX 122a and OTRX 122b the downlink direction signals are communicated to the respective RAU 126a and 126b where the signals are radiated from one or more antennas included in or coupled to the RAUs 126a and 126b to user devices in the respective coverage areas. That is, in this example, the downlink signals from the BTS 106a and 106b are simulcast from all of the RAUs 126a and 126b in the DAS 100. It is to be understood, however, that one or more downlink signals from one or more RF sources can be radiated from less than all of the RAUs 126.

In the uplink direction, signals from user devices are received by one or more of the first and second RAUs 126a and 126b. Signals received by the first RAU 126a are communicated to the first OTRX 122a. From the first OTRX 122a signals in the uplink direction are communicated to the POI 112a and POI 112b. Signals received by the second RAU 126b are communicated to the second OTRX 122b. From the second OTRX 122b, signals in the uplink direction are communicated to the POI 112a and POI 112b. At the first POI 112a, uplink signals intended for the first BTS 106a that were received at the first and second RAUs 126a and 126b are combined and the resulting combined uplink signals are communicated to the first BTS 106a. Likewise, at the second POI 112b, uplink signals intended for the second BTS 106b that were received at the first and second RAUs 126a and 126b are combined and the resulting combined uplink signals are communicated to the second BTS 106b. In this simulcast example, uplink signals from all of the RAUs 126a and 126b in the DAS 100 are combined to create the respective resulting uplink signal communicated to each BTS 106a and 106b. It is to be understood, however, uplink signals from less than all of the RAUs 126a and 126b in the DAS 100 can be combined to create the respective resulting uplink signal provided to one or more of the RF sources.

Although, sub rack 110 of the DAS master unit 102 is illustrated as having only two POIs 112a and 112b and two OTRXs 122a and 122b, any number of POIs and OTRXs can be used as part of a DAS 100 with many different communication paths between components of DAS 100. Also, for ease of explanation, only a single bi-directional communication link is shown between each OTRX 122 and a respective RAU 126, it is to be understood that such link can be implemented using one or more cables or other communication media (including different types of cables or other communication media) and using one or more intermediary units (such as an expansion unit).

Figure 2:
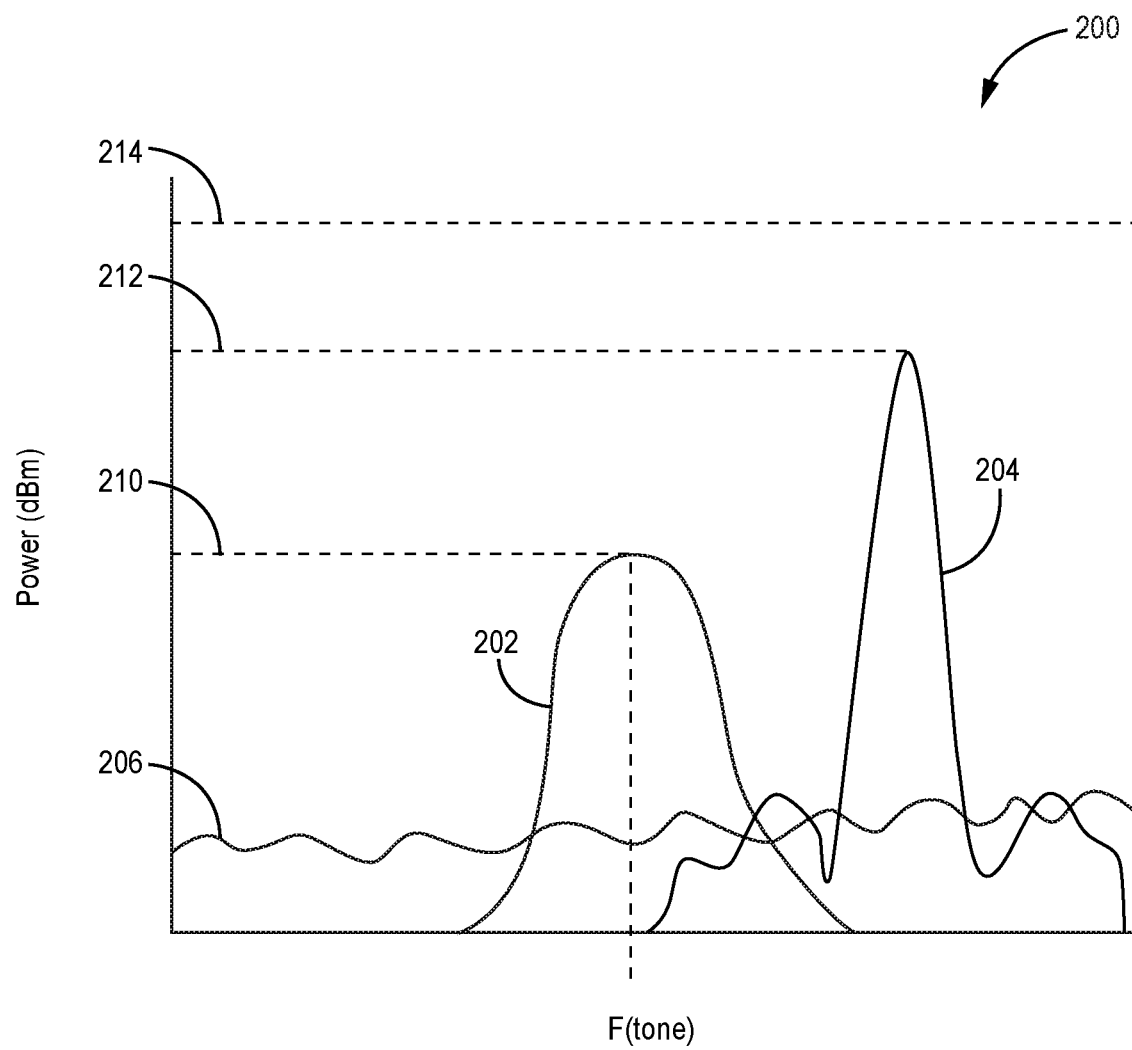
FIG. 2 is an example interfering signal graph.

As discussed above, each POI 112a and 112b typically includes a RF power detector. The RF power detector, is typically a true root mean square (RMS) power detector. A true RMS power detector calculates the RMS power of an input signal in response to the RF's signals AM envelope. Typically, at the core of an RMS detector is a full-wave rectifier, log/antilog circuit and an integrator. An RMS output signal is directly proportional to an average input signal expressed in dBm. The "average" power indication from the RMS detector is well suited for signal level and gain control. However, it is a broadband power detector that cannot be tuned to a specific frequency. Hence, if an external signal is received by an associated remote antenna unit at the same time a test signal is generated, the broadband power detector of a POI 112 cannot distinguish between the test signal and the interfering signal and measures the power of the combined signal. This can lead to incorrect measurement results and consequently to an incorrect leveling of the uplink communication path. The effect of an interfering signal on a measurement by a broadband power detector is illustrated in the interfering graph of FIG. 2. In particular, FIG. 2 illustrates a noise floor 206, a test signal 202 and an interfering signal 204 that occurs at the same time the test signal 202 is generated. The power level of the test signal is indicated at 210 and the power level of the interfering signal is indicated as 212. As a result of the inference signal 204, a measured power level 214 from the broadband power detector is above the power of the test signal 210 and the interfering signal 204 since the broadband power detector combines the power of both signals 210 and 212 in making a measurement. Hence the broadband power detector does not accurately measure of the power of the test signal 210 in the presence of an interfering signal 212. As stated above, this inability of the broadband power detector to be able to be tuned to a narrow frequency can lead to incorrect measurement results and consequently to an incorrect leveling of an uplink communication path if an interfering signal is present during leveling.

Embodiments described here use at least one RF power measuring device that can be tuned or adjusted to measure the power of a signal over a narrow frequency band. Referring back to FIG. 1, in the example shown n FIG. 1, the tunable power measuring device is a digital signal measurement receiver 114a or 114b, which can be generally referred to as a signal measurement receiver (SMR) and can be generally designated as 114. Parameters of the SMR 114, such as tuning frequency, can be adjusted. Hence, the SMR 114 can be set to measure signal power for a narrow frequency band used by the test signal or can be set to measure signal power for a broadband frequency range. In the example embodiment of FIG. 1, at least one SMR 114a or 114b is housed in either the first sub rack 110 with the POIs 112a and 112b or the second sub rack 120 with the first and second OTRX 122a and 122b of the DAS master unit 102. The at least one SMR 114a is in communication with at least one of the first and second POI 112a and 112b and the at least one SMR 114b is in communication with at least one of the first and second OTRX 122a and 122b. By analyzing the spectra of the received signals, the SMR 114a or 114b has the capability to distinguish interfering signals from the test signals. This information can then be used for uplink leveling as discussed in detail below.

Figure 3:
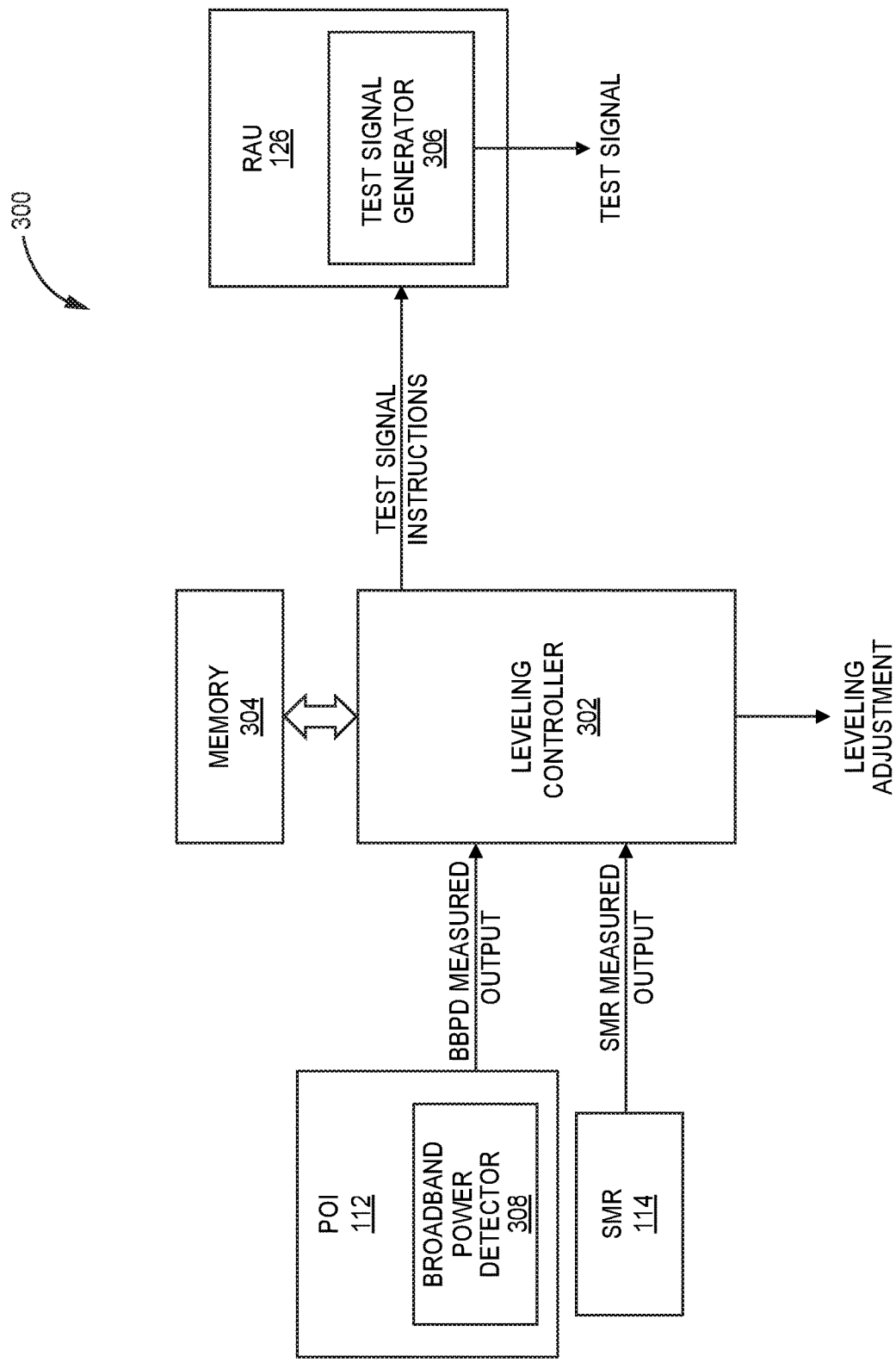
FIG. 3 is a block diagram of an uplink leveling system according to one exemplary embodiment.

Referring to FIG. 3, a block diagram of one embodiment of an uplink leveling system 300 is illustrated. The uplink leveling system 300 includes a leveling controller 302 and memory 304. The leveling controller 302 is in communication with the memory 304. In general, the leveling controller 302 may include any one or more of a microprocessor, a digital signal processor (DSP), an application specific integrated circuit (ASIC), a field program gate array (FPGA), or equivalent discrete or integrated logic circuitry. In some example embodiments, controller 302 may include multiple components, such as any combination of one or more microprocessors, one or more controllers, one or more DSPs, one or more ASICs, one or more FPGAs, as well as other discrete or integrated logic circuitry. The functions attributed to controller 302 herein may be embodied as software, firmware, hardware or any combination thereof and may be implemented using software, firmware, hardware or any combination thereof that implements functions other just the leveling functions described here. Memory 304 may include a non-transitory storage medium that is used to store instructions for such software or firmware that, when executed by the leveling controller 302, provide one or more functions of described here as being implemented by the controller 302. The instructions may be stored within the memory 304. Memory 304 may comprise storage media including any volatile, nonvolatile, magnetic, optical, or electrical media, such as, but not limited to, a random access memory (RANI), read-only memory (ROM), non-volatile RANI (NVRAM), electrically-erasable programmable ROM (EEPROM), flash memory, or any other storage medium.

In one embodiment, the leveling controller 302 is a controller of one of the POIs 112a or 112b. In another embodiment, the leveling controller 302 is a controller associated with the DAS master unit 102 as a whole. In still another embodiment, the leveling controller 302 is part of a leveling system that is remote to the DAS system 100. In an embodiment, the leveling controller 302 instructs one or more test signal generators 306 to generate a test signal. The test signal generator 306 in one embodiment is located in at least one of the RAU 126 (such as RAU 126a or 126b of FIG. 1). In response, each test signal generator 306 generates a test signal of a select power at a select frequency. The leveling controller 302 is communicatively coupled to receive the broadband power measurement from a broadband power detector 308, such as an RMS device in the POI 112. The leveling controller 302 is further communicatively coupled to receive power measurements from the SMR 114. As noted above, the broadband power detector 308 and SMR 114 can be implemented in the same device. The leveling controller 302 determines the proper gain and sets the leveling adjustments based on the received power measurements. Different methods, as discussed in detail below, can be used with the configuration discussed above to accomplish the uplink leveling.

FIGS. 4-10 are flow diagrams of various exemplary embodiments of methods of uplink signal leveling. In general, these methods are described here as being implemented in the DAS 100 of FIGS. 1 and 3, though other embodiments can be implemented in other ways.

The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

Also, each of the methods shown in FIGS. 4-10 is described here as being used to perform uplink leveling in a particular uplink signal path of a DAS 100, where the test signal generator 306 is deployed in or at a remote antenna unit 126 and generates a test signal that is communicated in one or more uplink signal paths to the master unit 102. Further in other embodiments, where the gain or loss is known or is fixed between the remote antenna unit 126 and another component in the uplink path, the placement of the test signal generator 306 in the uplink path is not limited to being located within the remote antenna unit 126. At the master unit 102, one or both of the SMR 114 and the broadband power detector 308 are used to measure the power of the received test signal and/or otherwise process the received test signal. It is to be understood, however, that the described methods can be used in other ways (for example, one or more of the test signal generator 306, the SMR 114, and the broadband power detector 308 can be deployed at a different node of the DAS 100).

Figure 4:
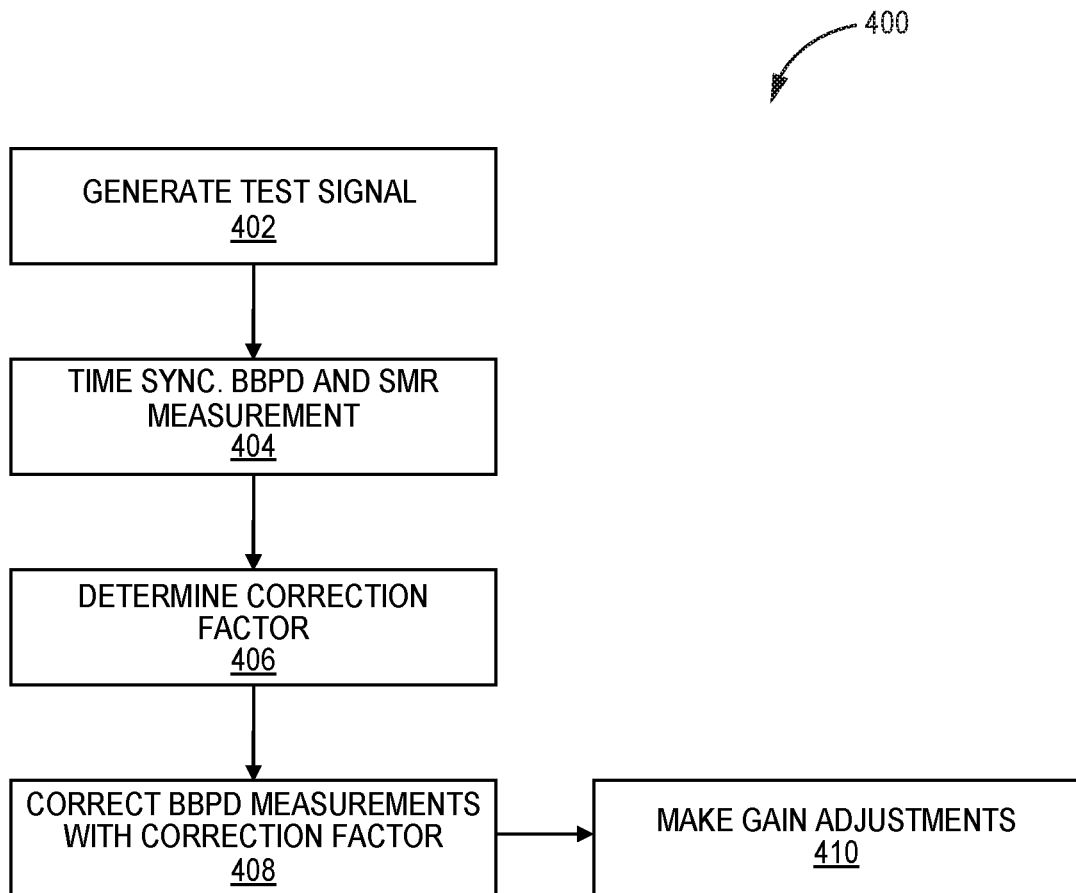
FIG. 4 is a leveling flow diagram according to one exemplary embodiment.

A flow diagram of an embodiment of a method 400 of uplink signal levelling is illustrated in FIG. 4. This method 400 is based on parallel power measurements with the broadband power detector 308 at a respective POI 112 and the SMR 114. The leveling method 400 comprises generating a test signal having a select frequency and a first test signal power level and communicating it to the master unit 102 over the DAS 100 using the uplink signal path that is being leveled (block 402). In this embodiment, method 400 further comprises making time-synchronized broadband and narrow band power measurements using the respective broadband power detector 308 and the SMR 114 (block 404). Using the power measurements, a correction factor is first determined (block 406). The correction factor is determined in one embodiment by using the SMR 114 to take a first power measurement over a narrow frequency associated with the test signal and a second power measurement over a broadband frequency in which the POI 112 operates across. From those two measurements, a test signal-to-total-power ratio correction factor is determined. This correction factor is then used with the power measurement of the broadband power detector 308 of the POI 112 to determine the correct gain adjustment for the communication path. That is, once the correction factor has been determined at block 406, the broadband measurement is corrected with the correction factor (block 408). For example, if the leveling controller 302 determines a correction factor of −3 dB based on the SMR 114 power measurements (the test signal in this example being at 50% of the total power) the power measured by the broadband power detector 308 should be reduced by 3 dB. Hence the correction factor in this example is to subtract 3 dB from the broadband power measurement made by the broadband power detector 308. Adjustments are made for leveling based on the corrected broadband power measurement (block 410).

Figure 5:
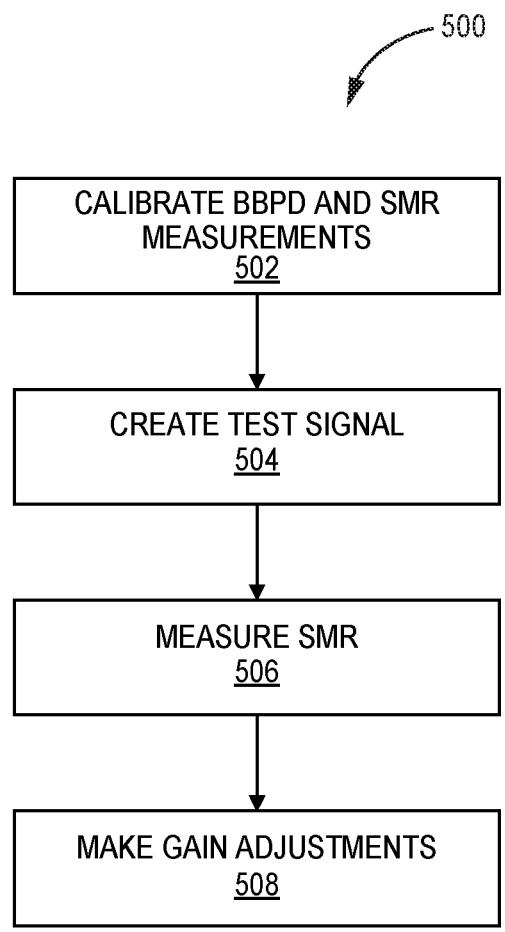
FIG. 5 is a leveling flow diagram according to another exemplary embodiment.

FIG. 5 is a flow diagram of another embodiment of a method 500 of uplink signal leveling. In the embodiment of method 500, the gain/loss between the SMR 114 and the POI 112 is determined and used to calibrate the power measurements made with the SMR 114 (block 502). Since there is a loss on the communication path between the POI 112 and the SMR 114, this loss needs to be measured. In one embodiment, this is done by generating a test signal of a certain frequency and power at the POI 112 and then measuring the power of the signal received by the SMR 114. Although, by design, the POI 112 can only generate test signals in the down link direction, the gains in the downlink and the uplink between the POI 112 and the narrow band measurement device 114 should be the same or may differ by a constant value. Based on this assumption, the gain of the uplink communication path between the POI 112 and the SMR 114 can be determined by the SMR 114 during the leveling process performed for the downlink. The gain/loss between the POI 112 and the SMR 114 is then used to determine a gain/loss factor, which is applied to adjust the power measurements made by the SMR 114. This adjusting of the power measurements made by the SMR 114 is referred to here as "calibrating" the SMR 114, and the resulting adjusted power measurements are referred to here as "calibrated" power measurements.

Once the SMR 114 is calibrated, a test signal having a select frequency and signal power level is generated and communicated to the master unit 102 over the DAS 100 using the uplink signal path that is being leveled (block 504). The SMR 114 then measures the power at the given frequency of the test signal (block 506) using the signal processing capabilities of the signal measured receiver 114. That is, only the power at the select frequency is measured, and any interfering signals are filtered from the test signal so that only the power of the test signal is measured. In order to determine the actual signal power level received by the POI 112, the signal power value of the test signal received by the SMR 114 is adjusted by the gain/loss calibration factor between the POI 112 and the SMR 114, which was determined during the calibration process discussed above. That is, the calibrated power measurement is determined. Adjustments in gains are then made by the POI 112 to level the communication path using the calibrated power measurement made using the SMR 114 measurements (block 508).

Figure 6A:
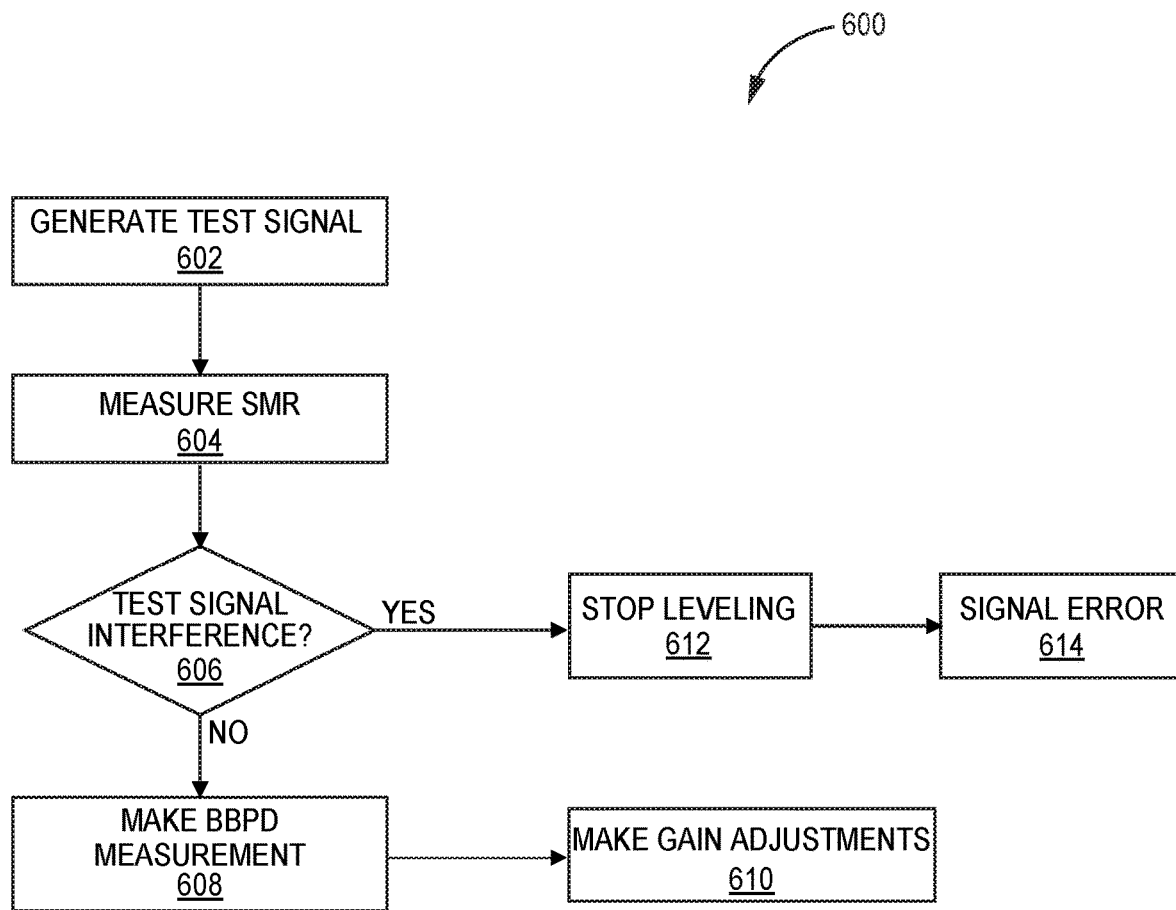
FIG. 6A is a leveling flow diagram according to another exemplary embodiment.

FIG. 6A is a flow diagram of another embodiment of a method 600 of uplink signal leveling. The embodiment of method 600 shown in FIG. 600 makes use of the signal processing capabilities of the SMR 114 to first check if an interfering signal is being transmitted in the vicinity of the remote antenna unit 126 before any uplink leveling measurements or adjustments are made. Method 600 comprises generating a test signal having a select frequency and power level and communicating it to the master unit 102 over the DAS 100 using the uplink signal path that is being leveled (block 602). Method 600 further comprises receiving the test signal at the select frequency using the SMR 114 and in the POI 112 (block 604). Method 600 further comprises determining whether there is an interfering signal at the select frequency (block 606). This is done using the signal processing capabilities of the SMR 114 (for example, by determining a signal-to-noise ratio (SNR) or other metric for the signal received at the select frequency and using the SNR or other metric to determine if there is an interfering signal).

If there is no interfering signal (block 606) or the interfering signal is low enough and isn't influencing the measurement, the broadband power at master unit 102 is measured using the broadband power detector 308 (while the test signal continues to be generated) (block 608) and any needed uplink leveling gain adjustments are made based on the broadband power measurements (block 610).

If there is an interfering signal (block 606) which is above a certain threshold and therefore high enough to influence the measurement, the uplink leveling process is stopped (block 612) without making any uplink leveling measurements or gain adjustments and an error is signaled (block 614). The uplink leveling process can be tried again at another time (for example, at a time when it might be the case that the interfering signal is not being transmitted). In this way, uplink leveling measurements and gain adjustments are not made when an interfering signal is being transmitted in the vicinity of the remote antenna unit 126 that is generating the test signal.

Figure 6B:
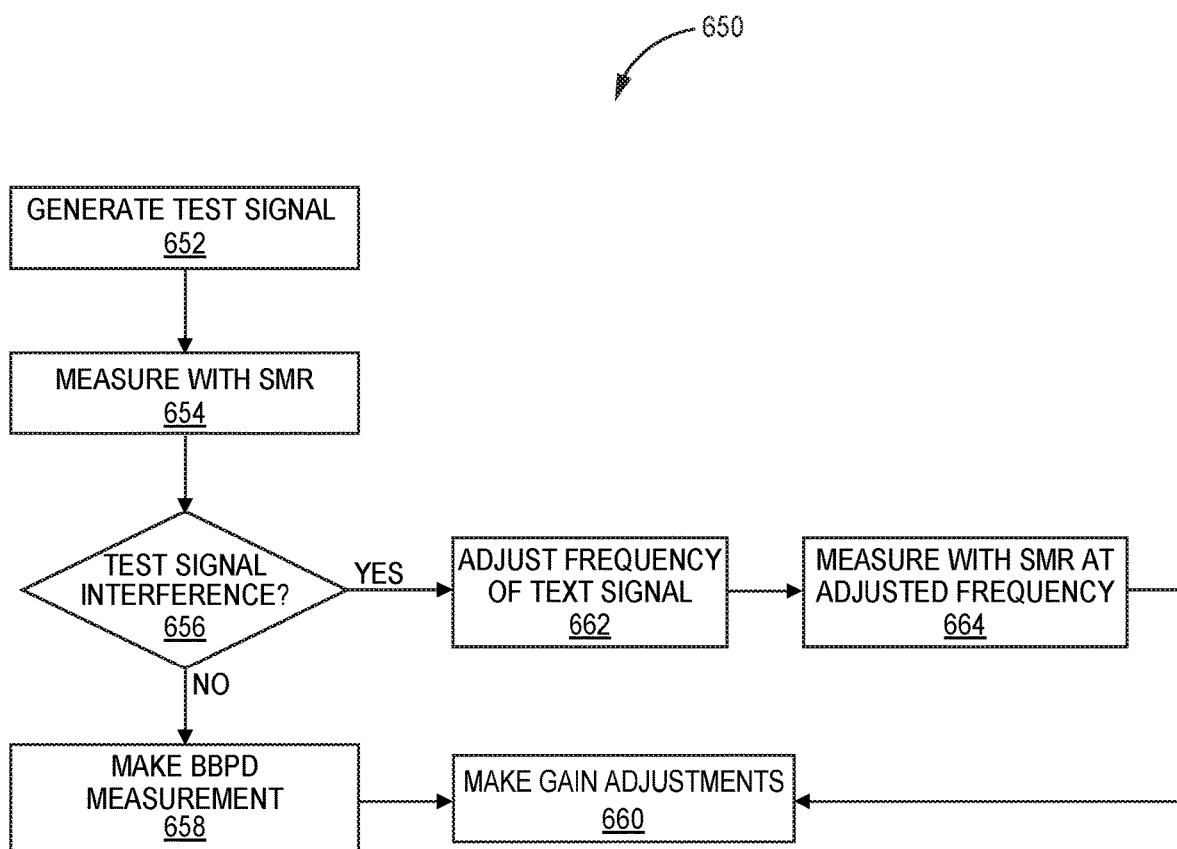
FIG. 6B is a leveling flow diagram according to another exemplary embodiment.

FIG. 6B is flow diagram of another embodiment of a method 650 that is variant of method 600 discussed above. Method 650 comprises generating a test signal having a select frequency and power level and communicating it to the master unit 102 over the DAS 100 using the uplink signal path that is being leveled (block 652). Method 650 further comprises receiving the test signal at the select frequency using the SMR 114 and in the POI 112 (block 654). Method 650 further comprises determining whether there is an interfering signal at the select frequency (block 656). This is done using the signal processing capabilities of the SMR 114 (for example, by determining a signal-to-noise ratio (SNR) or other metric for the signal received at the select frequency and using the SNR or other metric to determine if there is an interfering signal).

If there is no interfering signal (block 656) or the interfering signal is low enough and isn't influencing the measurement, the broadband power at master unit 102 is measured using the broadband power detector 308 (while the test signal continues to be generated) (block 658) and any needed uplink leveling gain adjustments are made based on the broadband power measurements (block 660).

In this embodiment, if there is an interfering signal (block 656) which is above a certain threshold and therefore high enough to influence the measurement, the frequency of the test signal is adjusted (block 662) to a frequency that does not have an interfering signal or has an interfering signal that is low enough to not influence the measurement. The test signal is then measured with the SMR 114 at the adjusted frequency (block 664). Any needed uplink leveling gain adjustments (block 660) are made based on the measured test signal power by the SMR 114 at the adjusted frequency. In one embodiment this is done by calibrating the broadband power detector 308 and the SMR 114 measurements similar to the method 500 of FIG. 5 and using the calibration in determining gain adjustments.

Figure 7:
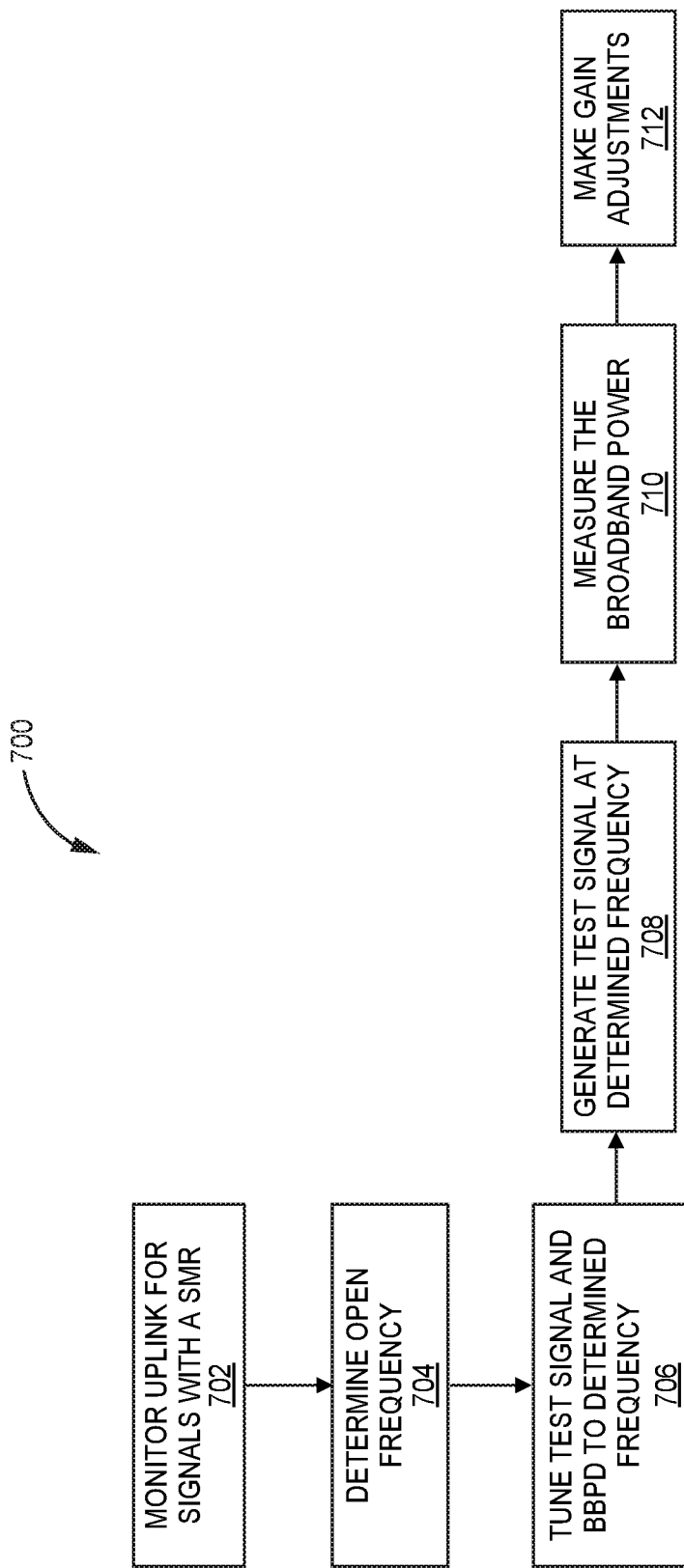
FIG. 7 is a leveling flow diagram according to another exemplary embodiment.

FIG. 7 is a flow diagram of another embodiment of a method 700 of uplink signal leveling. In this embodiment, the broadband power detector 308 has the ability to be tuned to multiple frequency bands. Method 700 starts by monitoring for signals in the uplink path (block 702) with the SMR 114. Using the SMR's abilities to be tuned to different frequencies, a frequency where no signal is present or where a signal power would be below a certain threshold that would not influence a measurement by the broadband power detector 308 is determined (block 704).

Method 700 further comprises tuning the test signal generator 306 and the broadband power detector 308 to the determined frequency (block 706), generating a test signal (using the test signal generator 306) at the determined frequency using a predetermined power (block 708), measuring the broadband power at the master unit 102 using the broadband power detector 308 (block 710), and performing any needed uplink leveling gain adjustments based on the broadband power measurements (block 712).

Figure 8:
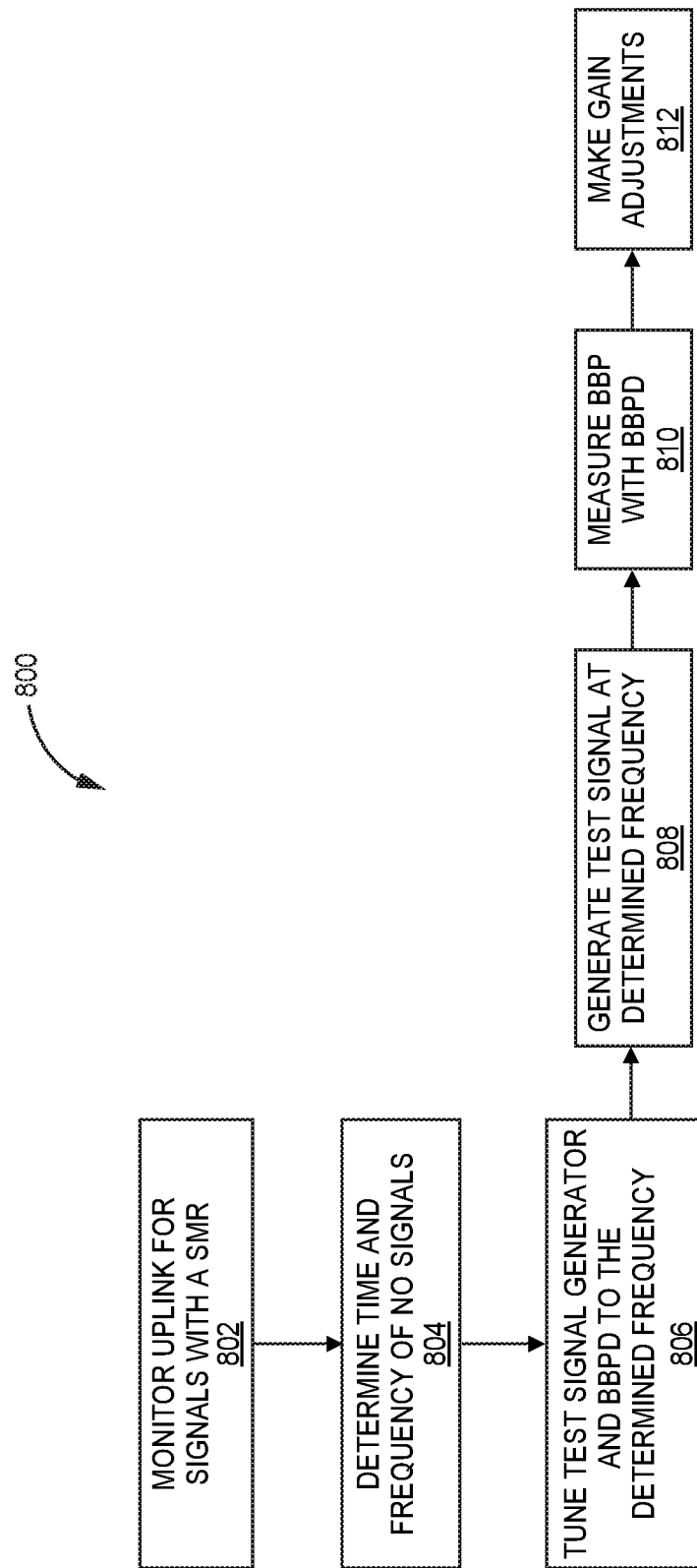
FIG. 8 is a leveling flow diagram according to another exemplary embodiment.

FIG. 8 is a flow diagram of another embodiment of a method 800 of uplink signal leveling. Method 800 also monitors the uplink for signals with the SMR 114 over different frequencies (block 802). In this embodiment, however, method 800 determines both a time and frequency where no signal is detected or where a signal power of a signal would be below a certain threshold that would not influence a test measurement by the broadband power detector 308 (block 804). This method may be beneficial in situations where an interference signal is periodic. For example, where the source of an interfering signal is a wireless sensor that periodically transmits sensor measurements to a gateway device. The SMR 114, in this embodiment attempts to determine the duty cycle of the wireless sensor. The test signal generator 306 is then configured to generate the test signal when the wireless sensor is not transmitting as discussed below.

Method 800 further comprises tuning the test signal generator 306 and broadband power detector 308 to the determined frequency (block 806), during those times when no interference with the test signal is expected, generating the test signal at the test signal generator 306 at the determined frequency using a predetermined power (block 808), measuring the broadband power at the POI 112 using the broadband power detector 308 (block 810), and performing any needed uplink leveling gain adjustments based on the broadband power measurements (block 812). In this way, uplink leveling can be performed despite the existence of an intermittent but periodic interfering signal.

Figure 9:
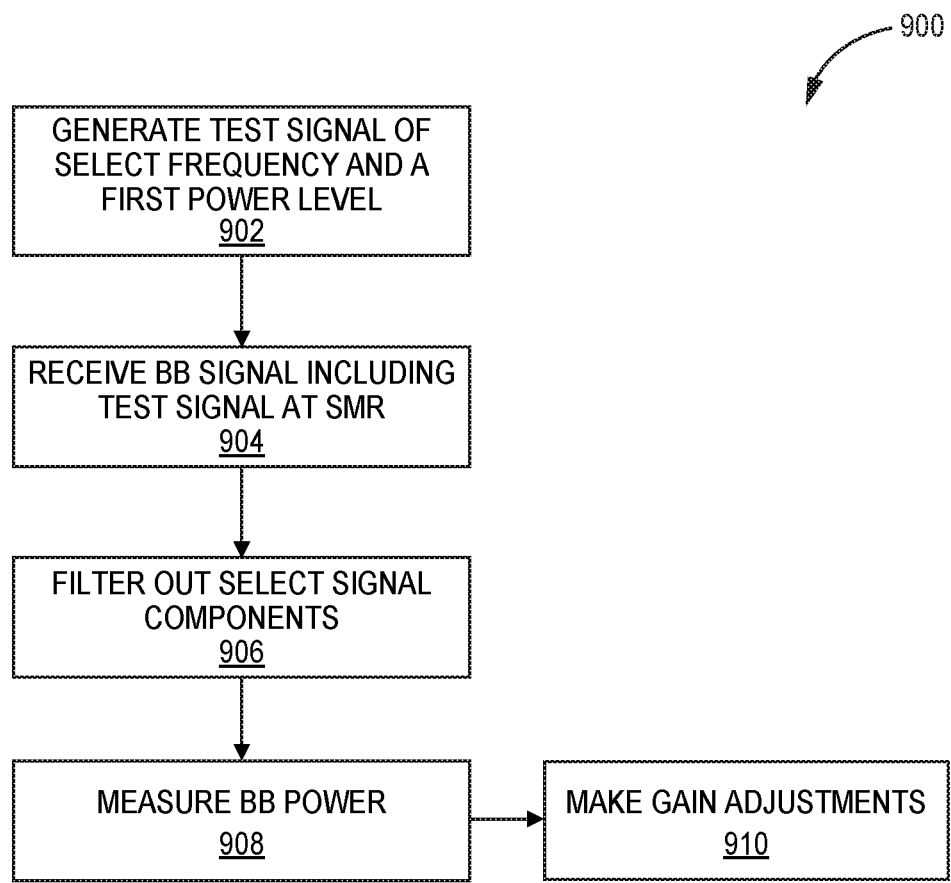
FIG. 9 is a leveling flow diagram according to another exemplary embodiment.

FIG. 9 is a flow diagram of another embodiment of a method 900 of uplink signal leveling. The embodiment of method 900 shown in FIG. 900 makes use of the signal processing capabilities of the SMR 114 to filter out any interfering signals present in the uplink signals prior to making the broadband power measurement at the master unit 102. In this embodiment, the DAS 100 is configured so that signals received over the uplink signal path being leveled are input to the SMR 114 and so that signals output by the SMR 114 can be provided to the broadband power detector 308.

Method 900 comprises generating a test signal having a select frequency and a first test signal power level and communicating it to the master unit 102 over the DAS 100 using the uplink signal path that is being leveled (block 902). Method 900 comprises receiving a broadband signal including the test signal at the SMR 114 in the master unit 102 (block 904) and filtering out, by the SMR 114, all signal components other than the test signal and outputting the filtered signal to the broadband power detector 308 (block 906). The signal processing capabilities of the SMR 114 are used to filter all signal components other than the test signal. For example, this can be done by using the SMR 114 to implement a digital band-pass filter with a narrow passband that corresponds to the frequency of the test signal and where an analog, filtered signal is output from the SMR 114.

Method 900 further comprises measuring the broadband power of the filtered signal output by the SMR 114 (block 908) and making any needed uplink leveling gain adjustments based on the broadband power measurements (block 910). The additional loss resulting from routing the test signal through the SMR 114 should be taken into account in making the uplink leveling gain adjustments. Because the filter signal output by the SMR 114 has had any interfering signals or noise present at the remote antenna unit 124 filtered out by the SMR 114, the broadband power measurement made by the broadband power detector 308 should reflect the power of the test signal as received at the master unit 102 and not the power of any interfering signals or noise.

Figure 10:
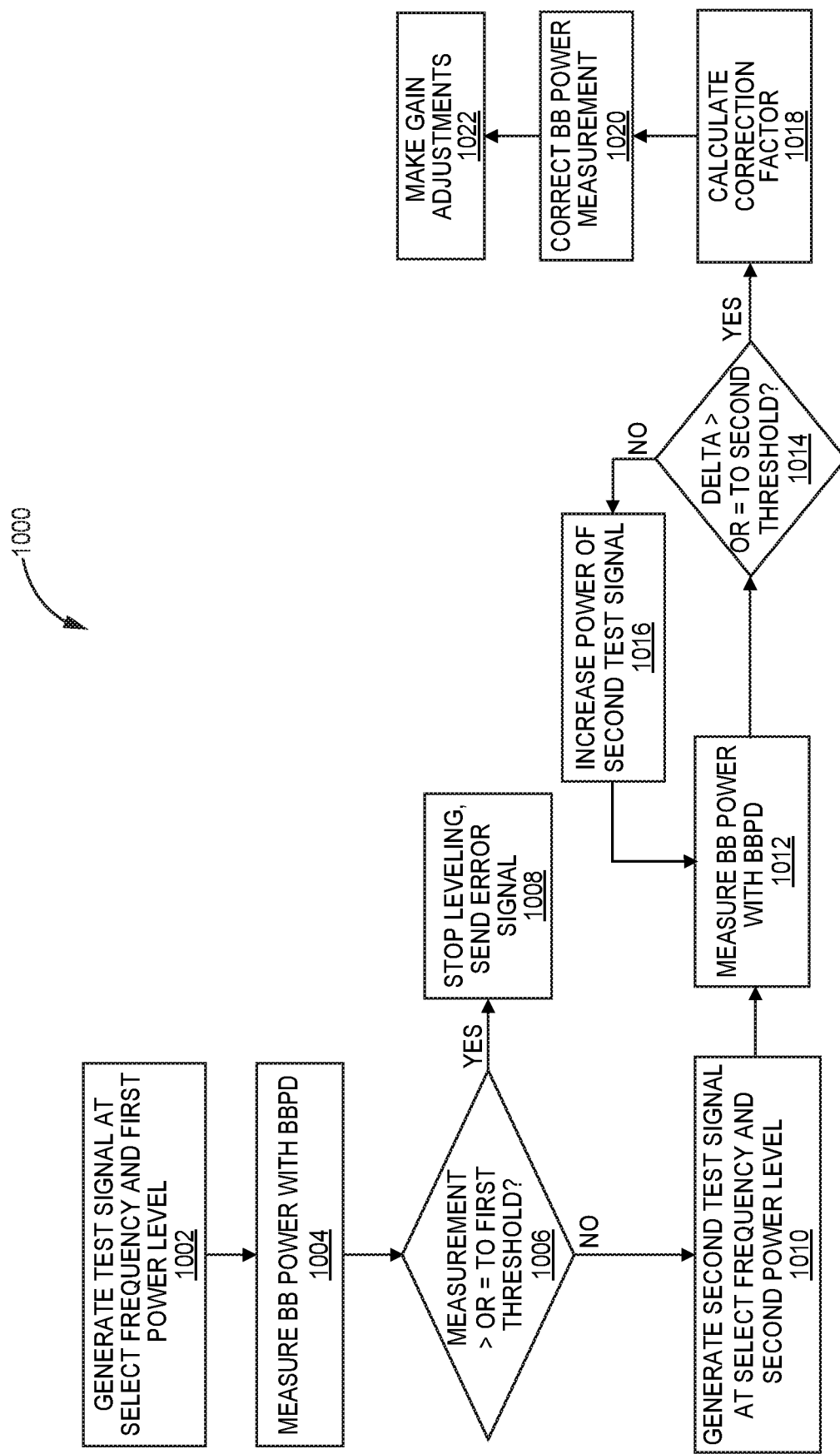
FIG. 10 is a leveling flow diagram according to another exemplary embodiment.

FIG. 10 is a flow diagram of another embodiment of a method 1000 of uplink signal leveling. The embodiment of method 1000 shown in FIG. 1000 uses test signals generated at multiple power levels in order to improve the accuracy of the broadband power measurements made using the broadband power detector 308.

Method 1000 comprises generating a test signal having a select frequency and a first test signal power level and communicating it to the master unit 102 over the DAS 100 using the uplink signal path that is being leveled (block 1002). The test signal is communicated to the SMR 114. This first test signal power level is a relatively low power level.

Method 1000 further comprises measuring the broadband power using the broadband power detector 308 in the master unit 102 while the test signal is being generated at the first test signal power level (block 1004). This broadband power measurement is also referred to here as the "first" broadband power measurement.

The processing described below can effectively correct for a limited amount of interference and noise at the remote antenna unit 126. If the amount of interference and noise is more than that limited amount, effective uplink leveling is not likely and the process is stopped. A first threshold power level can be used to determine when this is the case. The first threshold power level can be selected to correspond to the maximum amount of interference and noise that can be corrected for. This first threshold power level can be determined, for example, experimentally.

Method 1000 further comprises determining if the first broadband power measurement is greater than the first threshold power level (block 1006). If the first broadband power measurement is greater than the first threshold power level, the uplink leveling process is stopped without making any uplink leveling measurements or gain adjustments and an error is signaled (block 1008). As noted above, if the first broadband power measurement is greater than the first threshold power level, then the amount of interference and noise at the remote antenna unit 126 is greater than the amount that can be corrected for by the processing described below. The uplink leveling process can be tried again at another time (for example, at a time when there might be less interference and noise at the remote antenna unit 126).

If the first broadband power measurement is less than or equal to a first threshold power level (block 1006), the test signal is generated at the select frequency at a second test signal power level and communicated to the master unit 102 over the DAS 100 using the uplink signal path that is being leveled (block 1010). The second test signal power level represents an increase in the power level relative to the first test signal power level by a pre-defined ratio (for example, 10 decibels (dB) above the first test signal power level).

Method 1000 further comprises measuring the broadband power using the broadband power detector 308 in the master unit 102 while the test signal is being generated at the second test signal power level (block 1012). This broadband power measurement is also referred to here as the "second" broadband power measurement.

It is expected that, if there is no interfering signal or noise at the remote antenna unit 126, the ratio between the second broadband power measurement and the first broadband power measurement should be proportional to the difference between the second test signal power level and the first test signal power level.

If there is an interfering signal or noise at the remote antenna unit 126, the difference between the second broadband power measurement and the first broadband power measurement will be less than the difference between the second test signal power level and the first test signal power level.

The difference between the second broadband power measurement and the first broadband power measurement is also referred to here as the "broadband power measurement delta," and the difference between the second test signal power level and the first test signal power level is also referred to here as the "test signal power level delta." The difference between the broadband power measurement delta and the test signal power level delta can be used to correct the broadband power measurements. In one embodiment, the broadband power measurement delta should be sufficiently large for the correction to be effective. This can be determined by checking if the broadband power measurement delta is greater than or equal to a second power level threshold. This second threshold power level can be determined, for example, experimentally. In one example, where the pre-defined ratio between the second test signal power level and the first test signal power level is 10 dB, the broadband power measurement delta should be at least 3 dB, which would be used as the second power level threshold in this example.

Method 1000 further comprises determining if the broadband power measurement delta is greater than the second threshold power level (block 1014). If the broadband power measurement delta is not greater than the second threshold power level, then the second test signal power level is increased (block 1016) and the processing associated with blocks 1012-1014 is repeated using the larger test signal power level delta (which represents the difference between the increased second test signal power level and the first test signal power level).

If the broadband power measurement delta is greater than the second threshold power level, then a correction factor is calculated (block 1018), the broadband power measurements made using the broadband power detector 308 are corrected (block 1020), and any needed uplink leveling gain adjustments are made using the corrected broadband power measurements (block 1022). As a result of using the correction factor, the accuracy of the broadband power measurements made using the broadband power detector 308 is increased, thereby increasing the accuracy of the overall uplink signal leveling. Also, one additional advantage of method 1000 is that it does not require the use of a SMR 114.

EXAMPLE EMBODIMENTS

Example 1 is a method of uplink leveling a communication path in a distributed antenna system. The method includes generating a test signal of a select frequency and select power level in an uplink direction of the communication path; time synchronizing signal power level measurements of the test signal with a broadband power detector of a base station point of interface that is communicatively coupled to the communication path and a signal measurement receiver that is communicatively coupled to the communication path; determining a correction factor based at least in part on a comparison of a first power measurement taken at the select frequency associated with the test signal and a second power measurement over a broadband frequency in which the base station point of interface operates; determining gain adjustments based at least in part on the signal power level measurement of the broadband power detector and the correction factor; and leveling the communication path based on the determined gain adjustments.

Example 2, includes the method of Example 1, wherein the first power measurement and the second power measurement are both taken by the signal measurement receiver in determining a test signal-to-total-power ratio.

Example 3 includes the method of any of the Examples 1-2, further including calibrating measurements of a broadband power detector of a base station point of interface that is communicatively coupled to the communication path and a signal measurement receiver that is communicatively coupled to the communication path; generating at least one test signal of a select frequency and power level in an uplink direction of the communication path; measuring the power level of the at least one test signal with the signal measurement receiver at the select frequency; determining a gain adjustment based at least in part on the calibration of measurements of the broadband power detector and the signal measurement receiver and the measured power level of the at least one test signal with the signal measurement receiver; and leveling the communication path based on the determined gain adjustments.

Example 4 includes the method of any of Example 3, wherein calibrating measurements of the broadband power detector of a base station point of interface that is communicatively coupled to the communication path and the signal measurement receiver that is communicatively coupled to the communication path, further includes, generating a calibration signal of a select frequency and power with a signal generator in the base station point of interface; measuring a signal power level of the calibration signal with the signal measurement device; and determining a gain/loss between the base station point of interface and the signal management device based on a comparison of the signal power level of the calibration signal generated by the signal generator of the base station point of interface and the measured signal power level of the calibration signal by the signal measurement receiver to determine a gain/loss factor used for calibration.

Example 5 is a method of uplink leveling a communication path in a distributed antenna system, the method includes generating a test signal of a select frequency and power level in an uplink direction of the communication path; receiving the test signal with a signal measurement receiver that is communicatively coupled to the communication path; determining if there are interfering signals present at the select frequency with the signal measurement receiver; if there are no interfering signals present, determining gain adjustments based on a measurement of the test signal by a broadband power detector of a base station point of interface that is communicatively coupled to the communication path; and leveling the communication path based on the determined gain adjustments.

Example 6 includes the method of Example 5, wherein determining if there are interfering signals present at the select frequency with the signal measurement receiver further includes using signal processing capabilities of the signal measurement receiver to determine a signal-to-noise ratio of the measured test signal.

Example 7 includes the method of any of the Examples 5-6, further wherein if there are interfering signals present, stopping uplink leveling.

Example 8 includes the method of any of the Examples 5-7, further including if there are interfering signals present, adjusting the frequency of the test signal; measuring the power level of the test signal at the adjusted frequency with the signal measurement receiver; and determining gain adjustments based at least in part on the measurement of the test signal by the signal measurement receiver at the adjusted frequency.

Example 9 is a method of uplink leveling a communication path in a distributed antenna system. The method includes using a signal measurement receiver that is communicatively coupled to the communication path to measure signals in an uplink direction of the communication path; determining at least one open frequency where no signal is detected in the uplink direction of the communication path; tuning a test signal to the at least one open frequency; tuning a broadband power detector of a base station point of interface that is communicatively coupled to the communication path to the at least one open frequency of the test signal; generating the test signal at the at least one open frequency; measuring the power of the test signal at the at least one open frequency with the broadband power detector to determine gain adjustments; and leveling the communication path based on the determined gain adjustments.

Example 10 includes the method of Example 9, further including determining a timing of the open frequency; and generating the test signal during the determined timing of the open frequency.

Example 11 includes the method of any of the Examples 9-10, wherein determining at least one open frequency where no signal is detected in the uplink direction of the communication path further includes determining where a signal power of a signal would be below a certain threshold that would not influence a test measurement by the broadband power detector.

Example 12 is a method of uplink leveling a communication path in a distributed antenna system. The method includes generating a test signal of a select power level and frequency in an uplink direction of the communication path; receiving a detected broadband signal in response to the test signal with a signal measurement receiver that is communicatively coupled to the communication path; filtering out all components of the detected broadband signal except the test signal with the signal measurement receiver; outputting the filtered test signal to a broadband power detector of a base station point of interface that is communicatively coupled to the signal measurement receiver; measuring the power of the test signal with the broadband power detector to determine gain adjustments; and leveling the communication path based on the determined gain adjustments.

Example 13 includes the method of Example 12, wherein the filtering out of all components of the received signal except the test signal further includes using signal processing capabilities of the signal measurement receiver to filter out all of the components of the detected broadband signal.

Example 14 includes the method of any of the Examples 12-13, wherein determining the gain adjustment further takes into consideration additional losses resulting in routing the test signal through the signal measurement receiver to the broadband power detector.

Example 15 is a method of uplink leveling a communication path in a distributed antenna system, the method includes generating a first test signal at a first power level and a select frequency in an uplink direction of the communication path; measuring a power level of the first test signal with a broadband power detector of a base station point of interface that is communicatively coupled to the communication path to determine a first broadband power measurement; determining if the first broadband power measurement is greater than a first threshold power level, the first threshold power level being indicative of a maximum amount of interference and noise in a measured test signal that can be corrected for; if the power level of the first measured test signal power level is not greater than the first threshold power level, generating a second test signal at a second power level and the select frequency in an uplink direction of the communication path; measuring a power level of the second test signal with the broadband power detector of the base station point of interface that is communicatively coupled to the communication path to determine a second broadband power measurement; determining a broadband power measurement delta between the second measured test signal power level and the first measured test signal power level; if the broadband power measurement delta is one of greater than and equal to a second threshold power level, calculating a correction factor; using the correction factor to determine gain adjustments; and leveling the communication path based on the determined gain adjustments.

Example 16 includes the method of Example 15, wherein if the power level of the first measured test signal power level is at least one of less than and equal to the first threshold power level, stopping the leveling process.

Example 17 includes the method of any of the Example 15-16, wherein the second threshold is set sufficiently large for the corrective factor to be effective.

Example 18, includes the method of any of the Example 15-17, wherein if the broadband power measurement delta is less than the second threshold power level, increasing the power of the second test signal.

Example 19 includes the method of any of the Example 15-18, wherein calculating the correction factor further includes determining a difference between the second broadband power measurement and the first broadband power measurement to determine the broadband power measurement delta; determining a difference between the second test signal power level and the first test signal power level to determine a test signal power level delta; and determining a difference between the broadband power measurement delta and the test signal power level delta.

Example 20, includes the method of any of the Example 15-19, wherein the second power level of the second test signal is an increase over the first power level of the first test signal by a predefined ratio.

Example 21 is a method of uplink leveling a communication path in a distributed antenna system. The method includes generating at least one test signal of a select frequency and power level in an uplink direction of the communication path; measuring a signal power level with a broadband power detector of a base station point of interface that is communicatively coupled to the communication path in response to the at least one test signal; measuring at least one signal power level with a signal measurement receiver that is communicatively coupled to the communication path in response to the at least one test signal; determining a gain adjustment based at least in part on a comparison between the power level of the test signal and at least one of the measured signal power level by the broadband power detector and the measured at least one signal power level by the signal measurement receiver; and leveling the communication path based on the determined gain adjustment.

Example 22 is an uplink leveling system for a distributed antenna system. The uplink leveling system includes at least one communication path, a broadband measurement detector, a signal measurement receiver, a test signal generator and at least one controller. The at least one communication path is between a base station point of interface and a remote antenna unit. The broadband measurement detector is configured to measure signal power over a broadband frequency range. The broadband measurement detector is communicatively coupled to measure signal power in the at least one communication path at the base station point of interface. The signal measurement receiver is configured to be frequency tuned. The signal measurement receiver is communicatively coupled to measure signal power in the at least one communication path. The test signal generator is configured to generate a test signal in the at least one communication path in an uplink direction from the remote antenna unit to the base station point of interface. The at least one controller is in communication with the test signal generator, the signal measurement receiver and the broadband measurement detector. The at least one controller is configured to cause the test signal generator to generate the test signal having a select power and frequency. The at least one controller is further configured to control the tuning of the signal measurement receiver. The at least one controller is further still configured to level the communication path in the uplink direction based at least in part on measurements by the broadband measurement detector and the signal measurement receiver in response to the generated test signal by the test signal generator.

Example 23 includes the uplink leveling system for a distributed antenna system of Example 22, further including at least one memory to store leveling instructions, the at least one controller in communication with the at least one memory.

Example 24 includes the uplink leveling system for a distributed antenna system of any Examples 22-23, wherein the signal measurement receiver is within the communication path, the at least one controller configured to control the signal measurement receiver to only allow signals having the frequency of the test signal to pass to the base station point of interface.

Example 25 includes the uplink leveling system for a distributed antenna system of any Examples 22-24, wherein the at least one controller is further configured to time synchronize the measuring of the broadband measurement detector and the signal measurement receiver with the test signal.

Example 26 includes the uplink leveling system for a distributed antenna system of any Examples 22-25, wherein the at least one controller is further configured to synchronize at least one of frequency and timing of at least one of the broadband measurement detector and the signal measurement receiver with the test signal.

Example 27 includes the uplink leveling system for a distributed antenna system of any Examples 22-26, further including at least one transceiver in the at least one communication path, the transceiver positioned between the at least one remote antenna unit and the base station point of interface.

Example 28 includes the uplink leveling system for a distributed antenna system of Example 27, further including a first sub rack and a second sub rack. The at least one base station point of interface is received in the first sub rack. The at least one transceiver is received in the second sub rack.

Moreover, the at least one signal measurement receiver is housed in at least one of the first sub rack and the second sub rack.

Example 29 includes the uplink leveling system for a distributed antenna system of Example 28, further including a distributed antenna system master unit, the first sub rack and the second sub rack housed in the distributed antenna system master unit.

Although specific embodiments have been illustrated and described herein, it will be appreciated by those of ordinary skill in the art that any arrangement, which is calculated to achieve the same purpose, may be substituted for the specific embodiment shown. In addition, it will be understood that other variants that combine one or more methods described above can be implemented to achieve the same purpose of leveling in the uplink communication path. This application is intended to cover any adaptations or variations of the present invention. Therefore, it is manifestly intended that this invention be limited only by the claims and the equivalents thereof.

The invention claimed is:

1. A method of uplink leveling a communication path in a distributed antenna system, the method comprising:
    calibrating measurements of a signal measurement receiver that is communicatively coupled to a communication path with a point of interface by,
    generating a calibration signal of a select frequency and power with a signal generator in the point of interface,
    measuring a signal power level of the calibration signal with the signal measurement receiver, and
    determining a gain/loss between the point of interface and the signal measurement receiver based on a comparison of the signal power level of the calibration signal generated by the signal generator of the point of interface and the measured signal power level of the calibration signal by the signal measurement receiver to determine a gain/loss factor used for calibration;
    generating at least one test signal of a select frequency and power level in an uplink direction of the communication path;
    measuring the power level of the at least one test signal with the signal measurement receiver at the select frequency;
    determining a gain adjustment based at least in part on the calibration of measurements of the signal measurement receiver and the measured power level of the at least one test signal with the signal measurement receiver; and
    leveling the communication path based on the determined gain adjustments.

2. An uplink leveling system for a distributed antenna system comprising:
    at least one communication path between a point of interface and a remote antenna unit;
    a broadband measurement detector configured to measure signal power over a broadband frequency range, the broadband measurement detector communicatively coupled to measure signal power in the at least one communication path at the base station point of interface;
    a signal measurement receiver configured to be frequency tuned, the signal measurement receiver communicatively coupled to measure signal power in the at least one communication path;
    a test signal generator configured to generate a test signal in the at least one communication path in an uplink direction from the remote antenna unit to the base station point of interface; and
    at least one controller in communication with the test signal generator, the signal measurement receiver and the broadband measurement detector, the at least one controller configured to calibrating measurements of the signal measurement receiver, the at least one controller configured to cause the test signal generator to generate the test signal having a select power and frequency, the at least one controller further configured to determine gain adjustments based at least in part on the calibration measurements of the signal measurement receiver and a measured power level of the at least one test signal with the signal measurement receiver, the controller further configured to level the at least one communication path based on the determined gain adjustments, wherein the controller in calibrating the measurements of the signal measurement receiver is further configured to,
    generate a calibration signal of a select frequency and power with a signal generator in the point of interface,
    measure a signal power level of the calibration signal with the signal measurement receiver, and
    determine a gain/loss between the point of interface and the signal measurement receiver based on a comparison of the signal power level of the calibration signal generated by the signal generator of the point of interface and the measured signal power level of the calibration signal by the signal measurement receiver to determine a gain/loss factor used for calibration.

3. The uplink leveling system for the distributed antenna system of claim 2, further comprising:
    at least one memory to store leveling instructions, the at least one controller in communication with the at least one memory.

4. The uplink leveling system for the distributed antenna system of claim 2, wherein the signal measurement receiver is configured measure the power level of the test signal only at the select frequency of the test signal.

5. The uplink leveling system for the distributed antenna system of claim 2, further comprising:
    at least one transceiver in the at least one communication path, the transceiver positioned between the at least one remote antenna unit and the base station point of interface.

6. The uplink leveling system for the distributed antenna system of claim 5, further comprising:
    a first sub rack, the at least one base station point of interface installed in the first sub rack;
    a second sub rack, the at least one transceiver installed in the second sub rack.

7. The uplink leveling system for the distributed antenna system of claim 6, wherein the at least one signal measurement receiver is installed in at least one of the first sub rack and the second sub rack.

8. The uplink leveling system for the distributed antenna system of claim 6, wherein the distributed antenna system comprises:
    a master unit the master unit comprising the first sub rack and the second sub rack.

* * * * *